April 27, 1943.  J. D. WALLACE ET AL  2,317,568
SAWING MACHINE
Filed Nov. 1, 1940  6 Sheets-Sheet 1

INVENTORS:
John D. Wallace
Clifford H. Landis
BY Soans, Pond, & Anderson
Attys.

INVENTORS:
John D. Wallace
Clifford H. Landis
BY Evans, Pond, & Anderson
Attys.

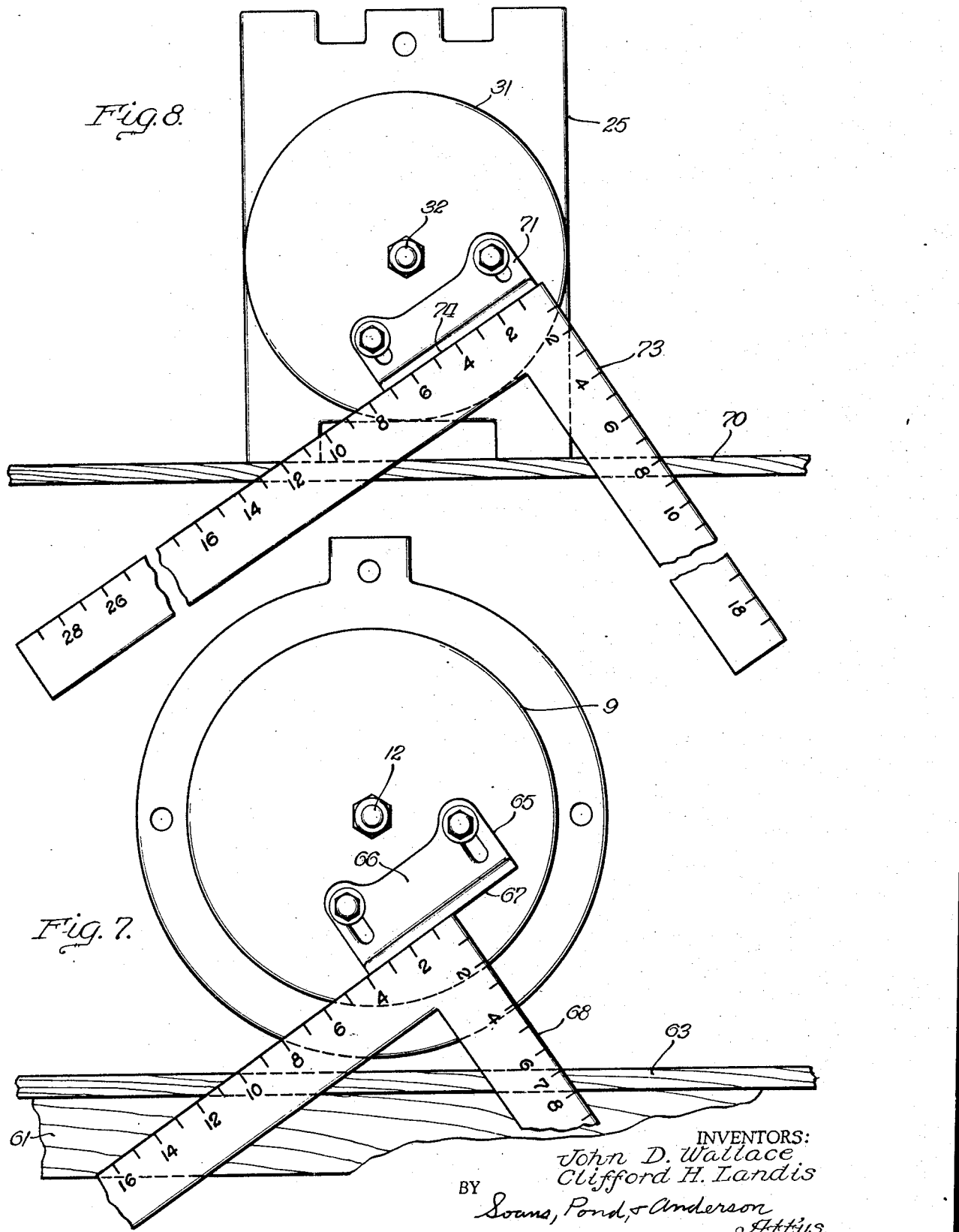

April 27, 1943.  J. D. WALLACE ET AL  2,317,568
SAWING MACHINE
Filed Nov. 1, 1940   6 Sheets-Sheet 6

INVENTORS:
John D. Wallace
Clifford H. Landis
BY Evans, Pond + Anderson
Attys.

Patented Apr. 27, 1943

2,317,568

UNITED STATES PATENT OFFICE 2,317,568

SAWING MACHINE

John D. Wallace and Clifford H. Landis, Chicago, Ill., assignors to J. D. Wallace & Co., Chicago, Ill., a corporation of Illinois Application November 1, 1940, Serial No. 363,850

7 Claims. (Cl. 143—6)

Our invention relates to certain improvements in wood working machinery of the type generally known as straight line sawing machines wherein, a power saw unit with a circular blade is mounted on a carriage for cutting pieces of work at different miter and bevel angles. The invention has particular relation to certain structural details and attachments which serve to greatly increase the production output of such machines.

Saw machines of this type are frequently portably mounted so that they may be easily moved about from one job to another. They are extensively used by contractors, builders, lumber yards, general building maintenance, etc. These radial saws may be used for many types of work such as, cutting rafters, making heel-cuts, for jointing, shaping, rabbeting, routing, and various other jobs.

An important object of our invention is to provide these saw units with certain guide means whereby a carpenter may utilize his carpenter's square in laying off pitch angles.

Another object of our invention is to provide these saw units with stop means whereby a number of like pieces of work, such as rafters, may be rapidly turned out without re-laying for cutting each piece.

Other objects of the invention will appear hereinafter.

For a more complete understanding of the nature and scope of our invention, and the purposes and utilization thereof, reference may be had to the following detailed description thereof taken in connection with the accompanying drawings in which:

Figures 7 and 8 are diagrammatic views showing the application of the carpenter's square to the horizontal and vertical angular adjustment of the saw machine of Figure 1;

Figure 1:
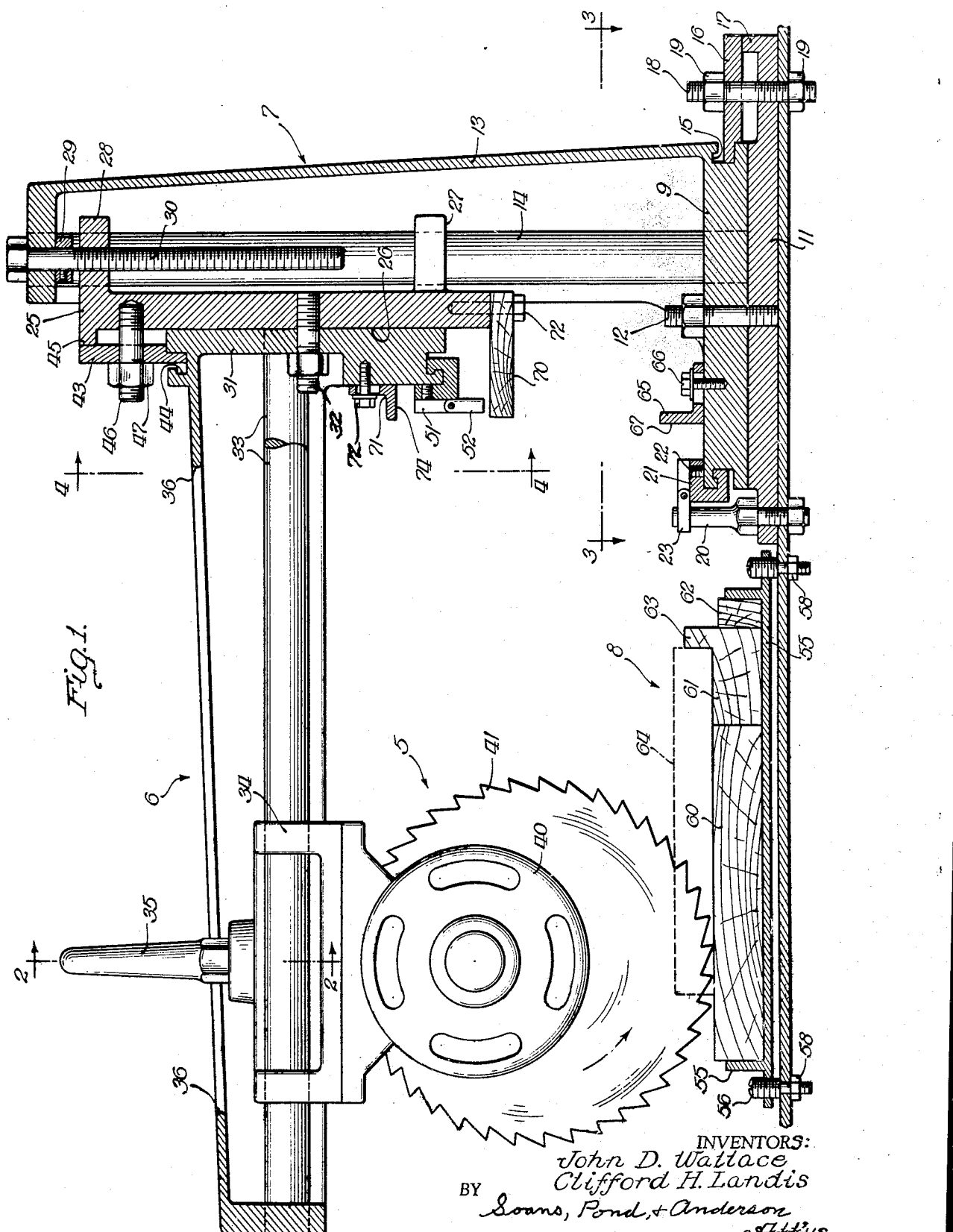
Figure 1 is a vertical section view taken on line 1—1 of Figure 2.
Figure 2:
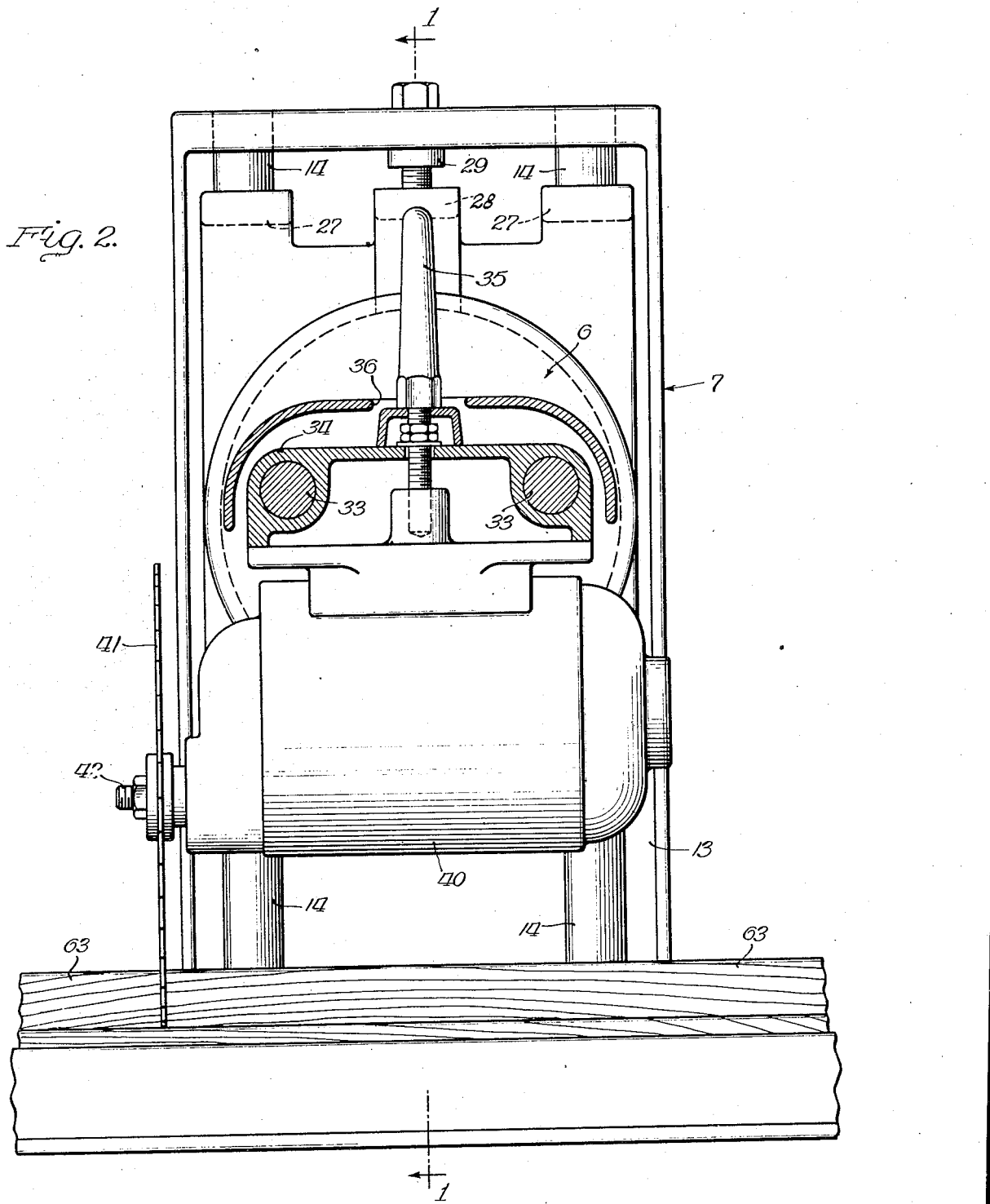
Figure 2 is an elevational view taken from the left hand end of Figure 1 with a vertical section at line 2—2 of Figure 1.

Referring now particularly to Figures 1 and 2 of the drawings, a so-called straight line saw machine is shown comprising a power saw unit indicated generally at 5, slidably supported on a horizontal beam support, or radial arm, indicated generally at 6. The beam arrangement 6 is supported on a vertical support standard indicated generally at 7 and is rotatable about a horizontal axis. The vertical support 7 is rotatable about a vertical axis. A work support table is indicated generally at 8 on which the pieces of lumber to be sawed may be supported.

In detail, the vertical support 7 comprises a base support plate 11 provided with a machined top bearing surface and a cast column member 13 provided with a circular machined base or foot 9 which rests upon the top of the bearing support plate 11. A center stud 12 projects from the support base 11 up to a central opening in the machined column base 9. A pair of upright machined support columns 14 are supported in the column 13 between the top and bottom thereof, as shown.

It will be seen that the column 13 may be rotated upon the support base 11 about the center stud 12. A machined groove 15 is cut around the periphery of the base 9. And, in order to clamp the support column 7 in any desired position, a clamp member 16 is provided with the undercut left end thereof projecting into the groove 15 and with the right hand end resting on an upstanding flange 17 of the support base 11. A bolt 18, threaded on both ends, passes through the support base 11 and the clamping plate 16, and the clamping member 16 may be drawn down into position by tightening the nuts 19 on the bolt 18.

Figure 3:
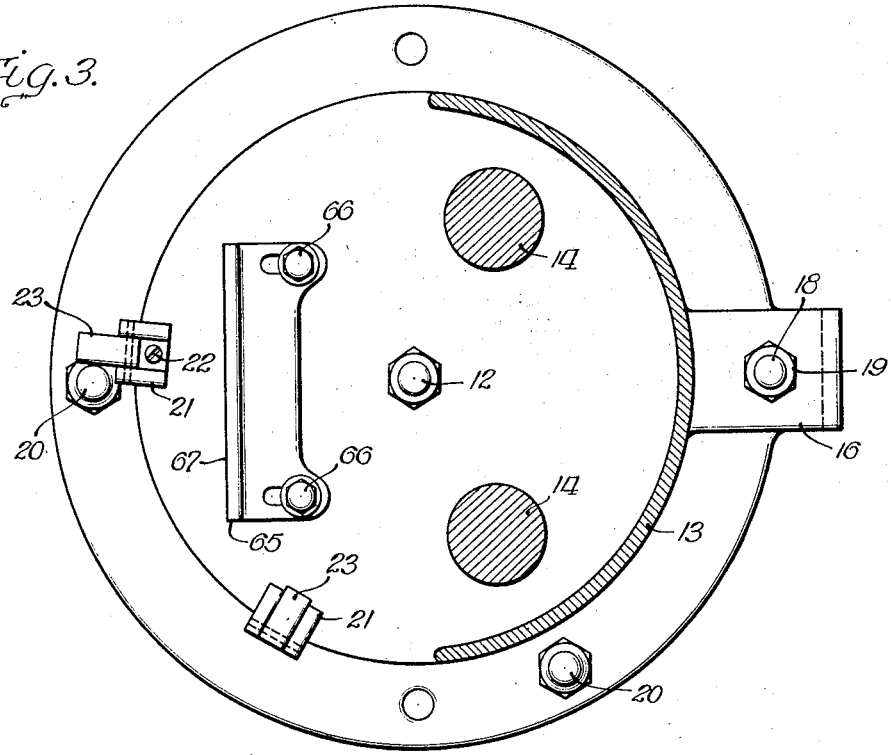
Figure 3 is an enlarged view taken on line 3—3 of Figure 1.

When a number of similar pieces of work are to be cut in the saw machine, production is stepped up by providing stop means to define the different positions to which the saw is to be swung for each cut. Referring to Figures 1 and 3, a pair of stop pins 20 are provided upstanding through the outer flange of the support base 11. It will be understood that in some cases one of the stop pins 20 will be sufficient, while in others, two or more may be used. A plurality of machined blocks 21 are provided which are adapted to be adjustably fastened in different positions in the guide groove 15 in the periphery of the support base 9. Each of the blocks 21 is fastened in place by means of a set screw 22 and carries a hinged catch 23 on the top thereof. When the hinged catches 23 are swung out, they engage the stop pins 20, and when the catches 23 are turned back over onto the blocks 21, the blocks will clear the stop pins 20.

The supporting arrangement for the radial arm 6 comprises a carriage 25 having a machined front surface 26 with two pairs of vertically aligned bosses 27 provided on the rear thereof. The bosses 27 have registering machined holes therein through which the upright guide posts 14 pass. It will be seen that the posts 14 serve as supports and guides for the carriage 25. In addition to the four bosses 27, another boss 28 projects from the carriage 25 between the upper pair of bosses 27 (Figure 2). The boss 28 fits in between the guide posts 14, and is provided with a vertical threaded opening. In order to raise and lower the carriage 25, a screw 30 is provided passing through a smooth hole in the top of the column 13 and threaded through the opening in the boss 28. The screw turns freely in the top of the column 13. A collar 29, fastened by a set screw to the screw 30, prevents the screw 30 from turning out in case the carriage sticks on the guide posts 14.

A machined base 31 is provided on the right hand end of the beam 6 which is adapted to fit against the bearing surface 26 of the carriage 25. A support stud 32 projects from the carriage 25 and passes through a central opening in the machined support end 31. A pair of parallel guide support rods 33 are supported between the left end of the beam 6 and the base 31, as shown. The guide rods 33 serve as support means for a motor carriage 34. The carriage 34 is a casting having a pair of horizontally aligned smooth openings through which the rods 33 pass. An operating handle 35 is secured in the top of the carriage 34, projecting up through a slot 36 in the top of the beam 6.

The power saw 5 comprises an electric motor 40 of suitable size depending from the carriage 34. A circular saw 41 is fastened to the left hand end of a drive shaft 42 (Figure 2) of the motor 40. In cutting through building materials, such as terra cotta, the saw 41 may be replaced with a carborundum wheel. The power saw unit 5 may be pushed in and out on the guide rods 33 so as to cut through the work on the table 8.

It will be seen that the beam 6 is rotatable about a horizontal axis through the stud 32. In order to clamp the beam 6 in any desired position to which it is turned, a clamping arrangement is provided therefor similar to that provided for the vertical column 13. This comprises a clamp member 43 with its bottom end projecting in a machined groove 44 cut in the periphery of the base 31, with its upper end fitting against a shoulder 45 projecting from the carriage 25. A bolt 46, threaded at both ends, passes through the clamp member 43 into the front of the carriage 25. The clamping member 43 may be tightened or drawn into position by tightening a nut 47 provided on the other end of the bolt 46. In order to readily turn the radial arm 6 from one fixed position to another, stop pins 50 (Figure 4) are provided projecting outwardly from the periphery of the carriage 25, similar to the stop pins 20. A number of machined blocks 51 are likewise provided, similar in construction to the blocks 21, which may be adjustably fastened in the groove 44 about the periphery of the base 31. The blocks 51 are provided with latches 52 which may be swung out to catch on the stop pins 50.

Figure 5:
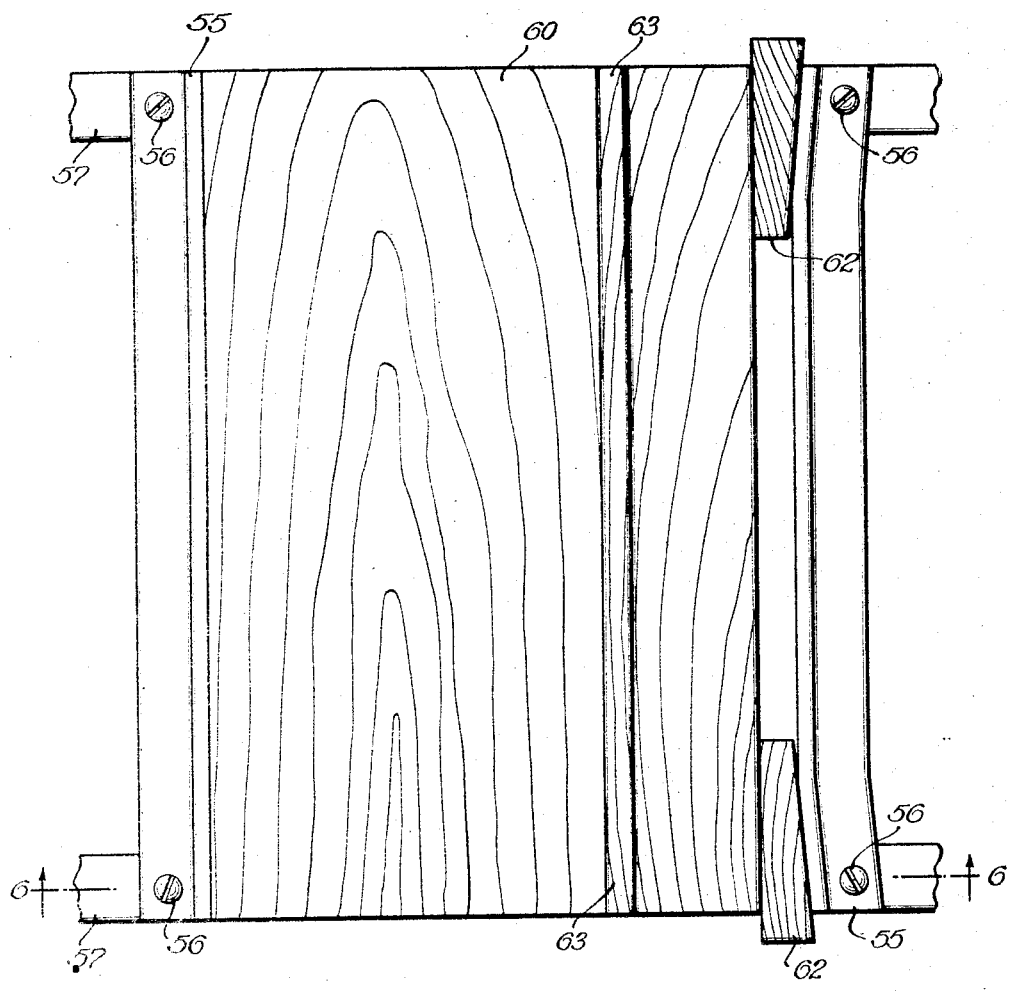
Figure 5 is a view of the work holding table of the saw machine and embodying certain features of the invention.
Figure 6:
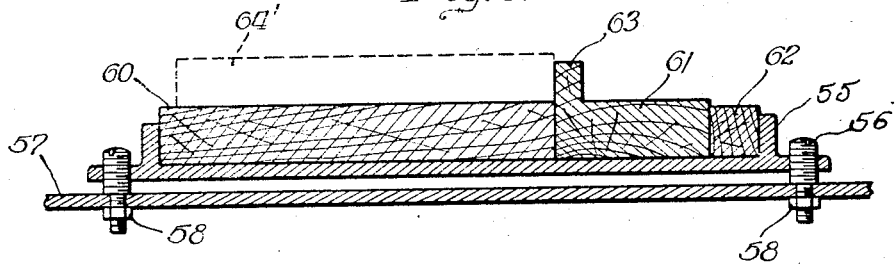
Figure 6 is a vertical section view taken on the line 6—6 of Figure 5.

The work holding table 8 of the saw machine is an important part of the invention. Referring particularly to Figures 1, 5 and 6 it will be seen that this table comprises a channel member 55 supported at each of its four corners by an adjusting screw 56. The adjusting screws 56 have large diameter threaded top sections which are screwed through threaded taps in the four corners of the member 55, and small diameter bottom portions which fit through four smooth holes in a pair of parallel support members 57, as shown in Figures 5 and 6. By loosening the nuts 58, the screws 56 may be turned so as to level and adjust the position of the channel holding member 55 in spaced apart relationship with the members 57. After adjustment and leveling of the work table 8, the nuts 58 may be tightened so as to keep the screws 56 from loosening or turning.

An important feature of the invention is a removable and reversible fence arrangement for the work holding table 8. In order to hold the work or wood being sawed on the table without dulling the saw blade 41, a wooden block 60 and a wooden fence member 61 are inserted in the channel of the member 55 and wedged in place by a pair of wedges 62. The wooden fence 61 is provided with an upstanding guide ridge 63 against which the work being sawed may be held. For purposes of illustration, a piece of work 64 outlined in broken lines is shown in place on the work table 8 in Figure 1. In Figure 6 the piece of work is indicated at 64'. The wooden block 60 and the wooden fence 61 are carefully cut and planed so that they fit squarely in the machined recess or trough of the channel member 55.

It will be noted that the fence 61 in Figures 5 and 6 of the drawings is reversed from the position thereof in Figure 1. With the reversible fence 61 in the position shown in Figure 1, the sawing machine is arranged so that the power saw unit 5 may be used for push-cuts through the work 64 on the table 8. In certain cases it is desired to use pull-cuts instead of the push-cuts. In the arrangement shown in Figure 1, there is not sufficient room to get the saw blade behind the upstanding guide ridge 63 for such pull-cuts. Accordingly, when it is desired to saw with pull-cuts the wedges 62 are removed and the fence 61 is turned around so that the upstanding ridge guide 63 is away from the column 7 and adjacent to a right hand edge of the block 60, as shown in Figures 5 and 6. This gives ample room for the saw blade 41 to start behind the upstanding ridge 63 and be pulled through the piece of work 64'. After the fence 61 is thus reversed, the wedges 62 may again be driven back into place.

It will be seen that since the support column 7 is rotatable about a vertical axis, and the support beam 6 is rotatable about a horizontal axis, the saw machine is adapted to cut work at different miter and bevel angles. By the term miter, we refer to any angular cut in a vertical plane through a piece of work, while we use the term bevel to refer to any angular cut through a piece of work not in a vertical plane. As stated, the present saw machine is adapted to make cuts which are both at miter and bevel angles. It will be understood that these terms may be used with other meanings in the art.

A very important feature of our invention is the provision of alignment or guide means on the sawing machine whereby the carpenter may use his square to set the machine for different pitch angles. A guide 65 is provided on the top of the machined column base 9. This guide 65 is adjustably fastened to the top of machine base 9 by a pair of bolts 66 as shown in Figure 3 of the drawings and has a plane vertical guide surface 67. In some constructions, the guide 65 may be integrally formed with the base 9. The guide member 65 is adjusted on the base 9 so that the guiding surface 67 thereof is normally perpendicular, and thereby parallel to vertical axis of rotation of the upright column 7. It will also be noted that the upstanding ridge 63 of the fence 61 extends in a direction at right angles to the axis of rotation of the radial arm 6. The guide member 65 and the ridge 63 should be about level with each other.

Figure 9:
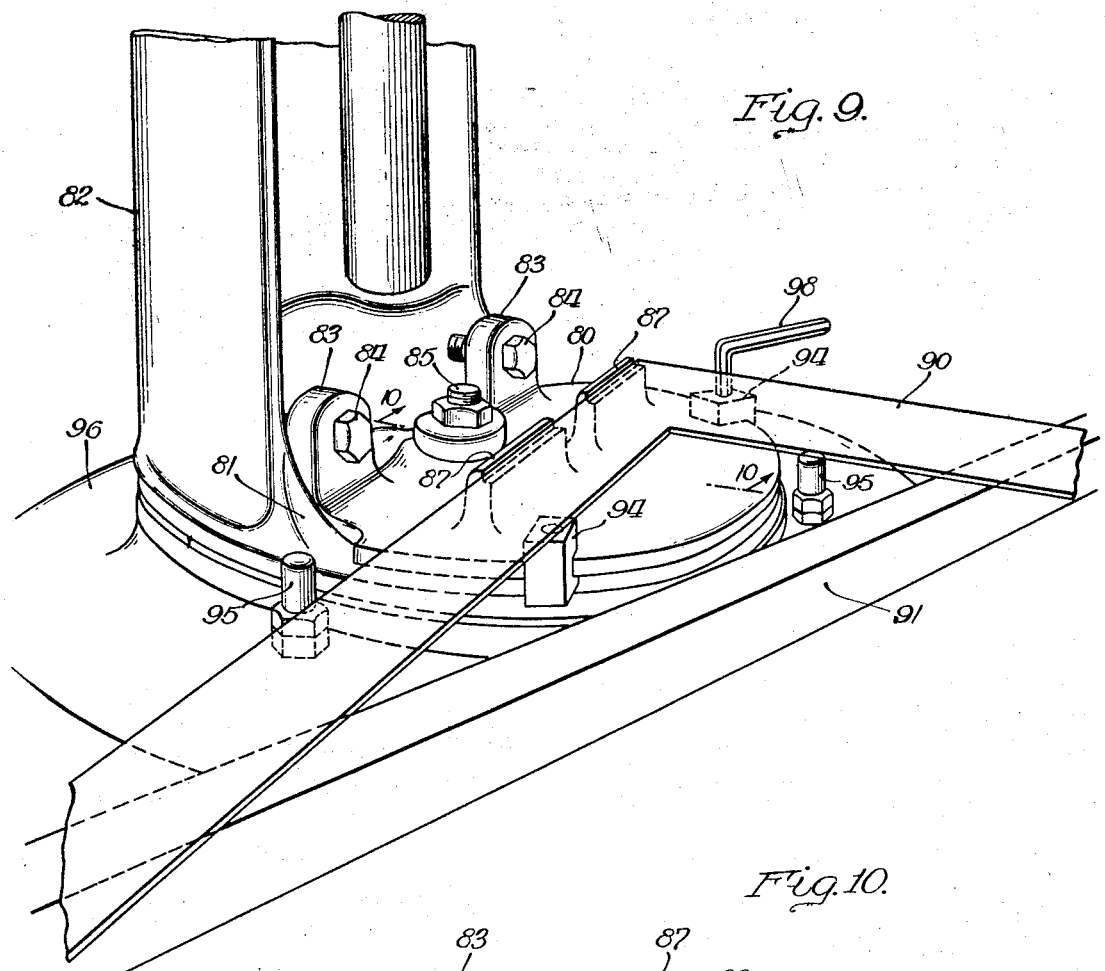
Figure 9 is a perspective view showing the adaptation of an attachment embodying certain features of our invention to a saw machine already in use; and, Figure 10 is a sectional view of the attachment taken on line 10—10 of Figure 9.

In Figure 9, the method by which the carpenter may lay off the desired miter angles or pitch is shown. The clamp member 16 is loosened so that the column 7 may be rotated. The carpenter then lays his square 68 in the position shown with one edge lying flat against the front edge 67 of the guide member 65. The arms of the square 68 rest on the top of the guide ridge 63 of the reversible fence 61. The column 7 is rotated until the desired pitch is obtained. For example, in Figure 9, the column 7 is shown rotated for a pitch of 7-10. When the position of the column 7 is obtained for one miter angle, one of the blocks 21 is fastened so that its latch 23 hits one of the stop pins 20. In the same manner, the column 7 is turned to any other desired angle or pitch and another one of the blocks 21 moved so that its latch 23 will hit one of the stop pins 20.

It will be seen that the upstanding portion 63 of the fence 61 serves both as a guide for pieces of work on the table 8 and also as a straight edge for use of the carpenter's square in connection with the guide 65.

Figure 4:
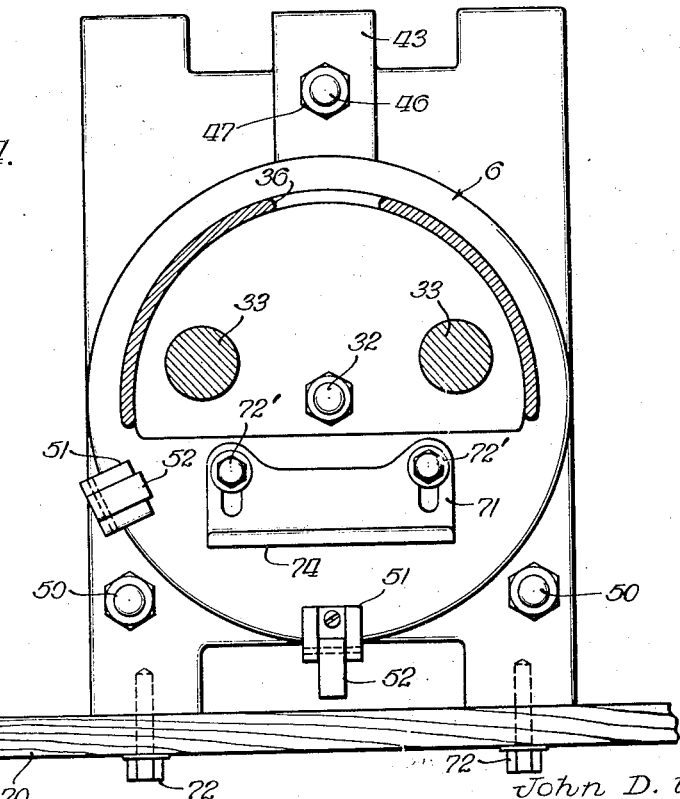
Figure 4 is an enlarged view taken on line 4—4 of Figure 1.

Likewise, in order to provide for angular adjustment of the support beam 6, a guide member 70 is bolted on the bottom of the carriage 25 by bolts 72 and a straight edge 71 is fastened on the face of the support end 31 by bolts 72'. This arrangement is best shown in Figures 1 and 4 of the drawings. The guiding surface 74 of the guide 71 is normally parallel to the horizontal axis of rotation of the arm 6, while the straight edge 70 extends in a direction at right angles to this horizontal axis. The guide members 70 and 71 should preferably lie in a substantially vertical plane, as shown.

In order to adjust for cutting bevel angles, the clamp member 43 is loosened so that the support beam 6 may be rotated and then the carpenter uses his square as shown in Figure 8 of the drawings. One edge of the corner of the square 73 is placed against the guiding surface 74 of the guide member 71 so that the legs of the square 73 project over the straight edge 70. The beam support 6 is then rotated to the desired pitch and one of the blocks 51 is moved and fastened into position so that its latch 52 engages one of the stop pins 50 projecting from the carriage 25. In the particular instance shown in Figure 8, a pitch of 3-12 is shown. In a similar manner, any other desired pitch angle is laid off and another block 51 set so that it determines this angle.

The operation of the saw machine shown in Figures 1 through 8, may be described in connection with cutting a number of pieces of work which are to be cut with two different miter angles and two different bevels. First, the carpenter, by the use of his square, sets a pair of blocks 21 and a pair of blocks 51 in the manner described above. The carpenter or operator then turns the column 7 to one of these positions and tightens down the clamp member 16. Likewise, the beam support 6 is turned to the proper angle as determined by one of the blocks 51 and the clamp member 43 is also clamped down. The power saw unit 5 is then pushed through this cut, after which the clamps 16 and 43 are loosened and the column 7 and support beam 6 are turned to the proper angles for the other cut through the piece of work. The clamps 16 and 43 are then retightened and this cut is made by the saw 5. In this manner the operator may quickly and accurately change from one cut to another without laying off the angles each time. The use of the clamps 16 and 43 is optional. If desired, the operator may hold the saw in proper position as determined by the stops without tightening the clamps. It will be understood that any desired number of the blocks 21 and 51 may be set for different cuts.

Two of the blocks 21 may be placed on opposite sides of a pin 20 and when the latches 23 thereof are turned out, the pin 20 and latches 23 on opposite sides will serve to lock the column 7 in position. Likewise, two of the blocks 51 may be placed on opposite sides of one of the pins 50 and the latches 52 turned out to lock the arm 6 in a desired rotated position.

Figure 10:
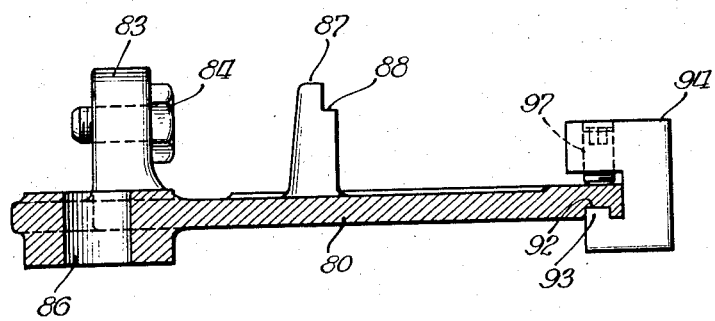

There are a number of saw machines which have already been in use prior to our invention on which an attachment may be installed so that the carpenter's square may be used in laying different pitches, thereby allowing this important feature of our invention to be incorporated thereon. In Figures 9 and 10 one form of such an attachment is indicated at 80 installed on the base or foot 81 of a vertical column housing 82. The column 82 corresponds to the vertical support column 13 of the saw machine shown in Figure 1. The attachment 80 is in the form of a flat plate casting provided with a pair of upstanding bars 83 by which it may be secured to the base of the support member 82 by a pair of bolts 84. A vertical stud bolt 85 passes up through a machined hole 86 in the attachment 80.

In order to provide for setting off pitches with the carpenter's square a pair of integral guides 87 are integrally formed on the top of the attachment plate 80. A carefully machined guide notch 88 is cut into the front edge of each of the guides 87. The edge of the carpenter's square 90 is shown resting in the notches 88, with the legs thereof extending over a straight edge 91. The straight edge 91, in this connection, corresponds to the upstanding straight edge 63 of the reversible fence 61 shown in Figure 1.

A groove 92 (Figure 10) is cut in the underside of the front edge of the attachment plate 80 to receive the shoulders 93 of a set of blocks 94. When the desired pitches have been laid out, by the use of the square 90, the blocks 94 are tightened into position so that they will engage the stop pins 95 upstanding from the support base 96. The blocks 94 may be conveniently fastened in place by means of the set screws 97 (Figure 10). The tops of these set screws are provided with socket recesses adapted to receive the socket wrench 98. In this particular embodiment the blocks 94 extend sufficiently from the periphery of the plate 80 to engage the stop pins 95. However, blocks of other types, such as blocks 21 and 51, Figure 1, having latches, may be substituted.

Since certain changes may be made in the foregoing construction and different embodiments of the invention may be made without departing from the scope thereof, it is intended that all matter described hereinbefore or shown in the accompanying drawings shall be interpreted as illustrative and not in a limiting sense, and that the appended claims be given the broadest construction consistent with the state of the prior art.

We claim:

1. In a device of the class described, the combination of a base, a work holding table, means rotatably mounted on said base, a power tool shiftably mounted on said means to traverse said work holding table, and a pair of guide members adapted to co-act with a carpenter's square to permit the determination of the angular disposition of said means so as to position said power tool unit angularly of said work holding table, one of said guide members being separately formed from and positioned in spaced relation to the portion of said means which supports said power tool, and the other guide member being fixed relative to said base, said guide members having the faces thereof which contact the square respectively parallel and perpendicular to the axis of rotation of said means.

2. A straight line sawing machine comprising a work holding table, a base, a standard mounted on said base and rotatable on a vertical axis, an arm carried by said standard, a power saw unit movably supported on said arm to traverse said table, a guide on said standard separately formed from and positioned in spaced relation to the portion of said standard which supports said arm and adapted to form an abutment for a carpenter's square, a second guide fixed relative to said base with the face thereof which contacts said square permanently in a plane at right angles to the plane of said first guide abutment and coacting with the carpenter's square to determine the angular disposition of said power saw unit relative to said work holding table, and means for locking said standard in any one of various angular positions relative to said base.

3. A straight line sawing machine comprising a work holding table, a base, a standard on said base, an arm carried by said standard and rotatable on a horizontal axis relative to said standard, a power saw unit movably supported on said arm to traverse said table, a guide on said arm adapted to serve as an abutment for a carpenter's square, a second guide on said standard with the face thereof which contacts said square permanently in a plane at right angles to the plane of said first guide abutment and adapted to cooperate with the carpenter's square to determine the angular adjustment of said power saw unit relative to the plane of said work holding table, and means for locking said arm in any one of various angular positions relative to said standard.

4. A straight line sawing machine of the class described adapted to cut through pieces of work at different miter angles, comprising in combination, a work holding table; vertical support means rotatable about a vertical axis; horizontal support means extending over said work holding table and mounted on said vertical support means; a power saw unit, having a circular saw blade, mounted from said horizontal support means and movable back and forth across said work holding table; guide means mounted on said rotatable vertical support, said guide means being separately formed from and positioned in spaced relation to the portion of said vertical support which carries said horizontal support means, the guiding face of said guide means being parallel to said vertical axis; and a straight edge fixedly mounted separate from said rotatable vertical support means and having its right angle faces extending perpendicular and parallel respectively to said horizontal support means whereby a carpenter square coacts with said guide means and straight edge in laying off the pitch of different angle cuts through pieces of work on said work holding table.

5. A straight line sawing machine of the class described adapted to cut through pieces of work at different bevel angles comprising, in combination, a work holding table; vertical support means; horizontal support means projecting over said work holding table and mounted on said vertical support means and rotatable about a horizontal axis; a power saw unit, having a circular saw blade, carried by said horizontal support means and movable back and forth across said work holding table; guide means mounted on said rotatable horizontal support means the guiding surface of which is parallel to said horizontal axis; and a straight edge mounted on said vertical support means separately from said rotatable horizontal support means and having the abutting face thereof disposed perpendicular to the axis of rotation of said support means; said guide means and straight edge coacting with a carpenter's square in laying off the pitch of different angle cuts through pieces of work on said work holding table.

6. A straight line sawing machine comprising a work holding table, a base, a standard mounted on said base and rotatable on a vertical axis, an arm carried by said standard, a power saw unit movably supported on said arm to traverse said table, a separately formed guide member adjustably mounted on the foot of said standard and adapted to form an abutment for a carpenter's square, a second guide fixed relative to said base with the face thereof which contacts said square permanently in a plane at right angles to the plane of said first guide abutment and coacting with the carpenter's square to determine the angular disposition of said power saw unit relative to said work holding table, and means for locking said standard in any one of various angular positions relative to said base.

7. A straight line sawing machine of the class described for cutting pieces of work at different angles comprising, in combination, work holding means including a fence member; a base; an upright support column rotatably mounted on said base; a horizontal support arm projecting over said work holding means and mounted at one end on said upright support column; a power saw unit, having a circular saw blade, mounted from said horizontal support arm and movable back and forth across said work holding means; a guide member provided on the foot of said upright support column separate from and positioned in spaced relationship to the portion of said support column which carries said horizontal support arm; said fence member being at about the same level as said guide member; said guide member and said fence coacting with a carpenter's square in laying off the pitch of different angle cuts through pieces of work on said work holding means and for setting said rotatable upright support column to locate said power saw unit for the desired cutting angles; and said fence also serving as guide means against which pieces of work on said work holding means are held.

JOHN D. WALLACE.
CLIFFORD H. LANDIS.